H. E. DENMAN.
FORK.
APPLICATION FILED JULY 15, 1919.
1,343,811.
Patented June 15, 1920.
2 SHEETS—SHEET 1.
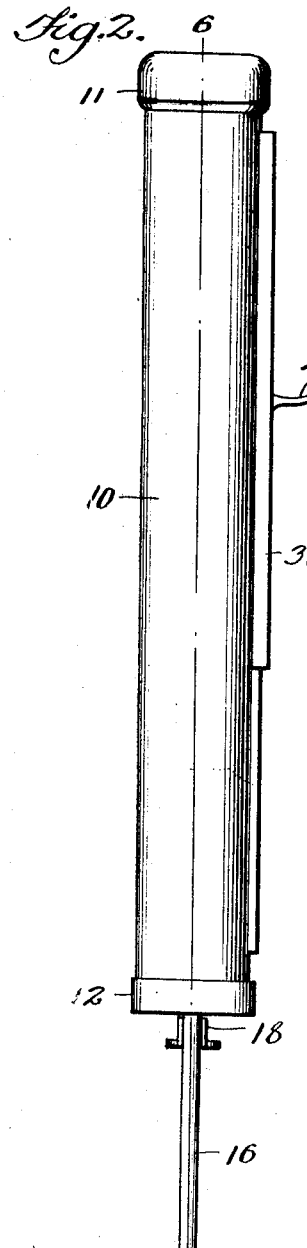
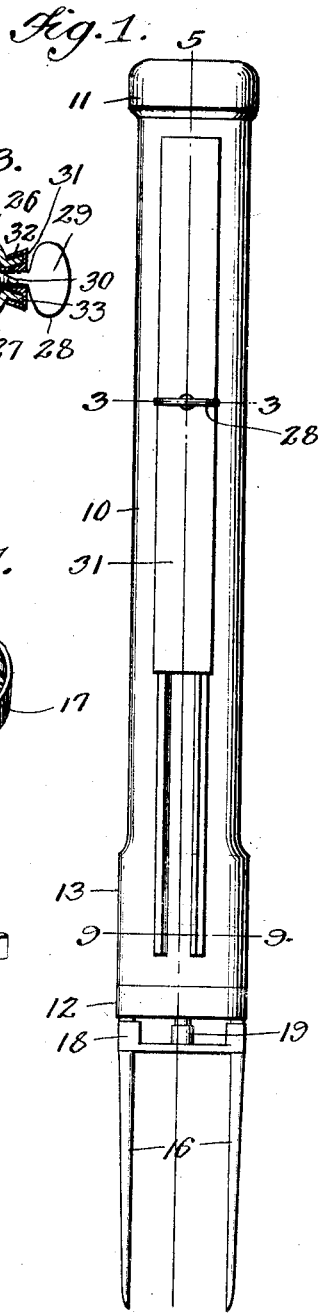
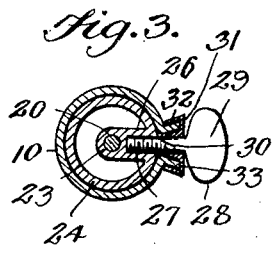
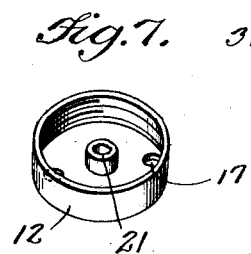
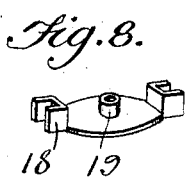
INVENTOR.
H. E. Denman,
BY
Victor J. Evans
ATTORNEY.

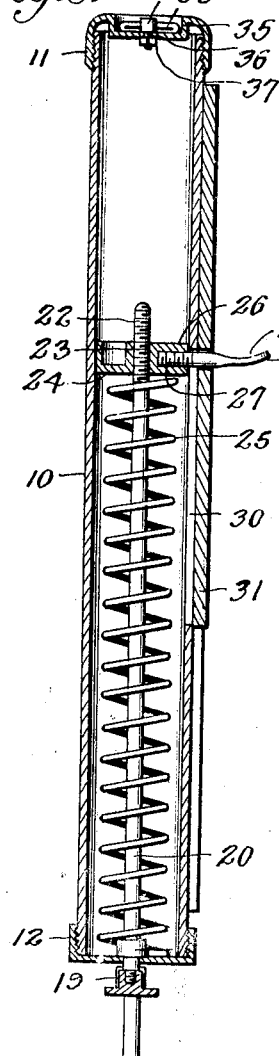
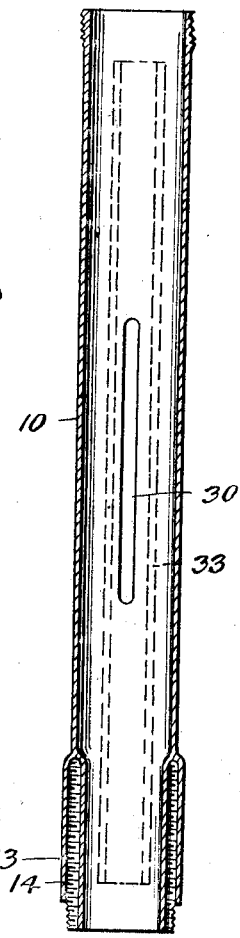
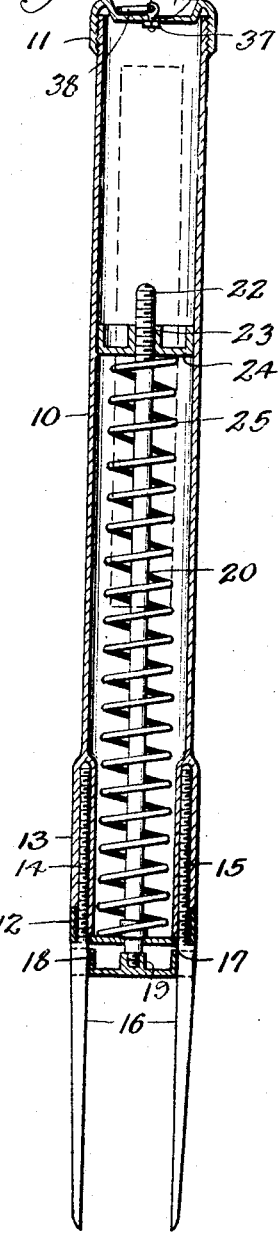
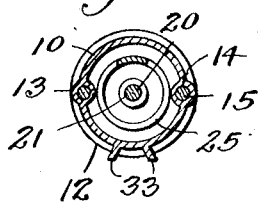

UNITED STATES PATENT OFFICE.

HUGH EMERY DENMAN, OF HARWOOD, TEXAS.

FORK.

1,343,811. Specification of Letters Patent. Patented June 15, 1920.

Application filed July 15, 1919. Serial No. 310,914.

*To all whom it may concern:*

Be it known that I, HUGH E. DENMAN, a citizen of the United States, residing at Harwood, in the county of Gonzales and State of Texas, have invented new and useful Improvements in Forks, of which the following is a specification.

This invention comprehends the provision of a fork, particularly useful for cooks, and embodying means which can be easily operated by either the thumb or finger of the user, to remove from the prongs of the fork, food stuff which clings to the latter.

The nature and advantages of the invention will be better understood when the following detailed description is taken in connection with the accompanying drawings, the invention residing in the construction, combination and arrangement of parts as claimed.

In the drawings forming part of this specification, like numerals of reference indicate similar parts in the several views and wherein:

Figure 1 is a front elevation of the fork constructed in accordance with my invention.

Fig. 2 is a side elevation.

Fig. 3 is a transverse sectional view taken on line 3—3 of Fig. 1.

Fig. 4 is a vertical sectional view through the hollow tubular handle.

Fig. 5 is a vertical sectional view taken on line 5—5 of Fig. 1.

Fig. 6 is a similar view taken on line 6—6 of Fig. 2.

Fig. 7 is a detailed perspective view of the cap for the lower end of the handle.

Fig. 8 is a similar view of the cleaning element for the prongs.

Fig. 9 is a transverse sectional view taken on the line 9—9 of Fig. 1.

A fork constructed in accordance with my invention, essentially embodies a hollow tubular handle or body portion 10, which is threaded adjacent its opposite ends to accommodate upper and lower caps 11 and 12 respectively which close the opposite ends of the handle. The body or handle portion 10 adjacent its lower end is thickened as at 13, and this portion is provided with diametrically opposed parallel bores 14. The bores 14 are internally threaded to accommodate the threaded extremity 15 of the prongs 16, the lower cap 12 being provided with openings 17 which when the cap is associated with the handle body portion 10, lies in alinement with the bores 14 so that the prongs are passed through the cap 12 into said bores.

For the purpose of removing food stuff from the prongs 16, which has a tendency to cling to the latter, I employ a cleaning element which is in a nature of a plate arranged between the prongs 16 exteriorly of the cap 12. The plate is provided with split sleeves 18 at the ends thereof, and these sleeves embrace the prongs 16 for sliding movement thereon. The plate is centrally provided with a hollow boss 19 which threadedly receives the adjacent end of an operating rod 20, the latter passing through a central opening 21, in the cap 12 and arranged to reciprocate within the body or handle portion 10. The opposite extremity of the said rod is threaded as at 22 to be received within the central threaded opening 23 of a follower or disk like member 24. A coiled spring 25 is positioned within the body or handle portion 10, and encircling the rod 20 and having one end bearing against the cap 12 and its opposite end engaged against the follower or disk 24. The spring is tensioned to normally maintain the cleaning element or plate 17 in a position upon the prongs 16 in close proximity to the cap 12, thus permitting the fork to be used in the usual manner without any interference by the cleaning element or plate 17. Manifestly, the follower or disk like member 24 can be adjusted upon the threaded extremity 22 of the rod 20, as the occasion requires to adjust or vary the tension of the spring 25. The disk or follower 24 is provided with a threaded bore 26 arranged at right angles to the central opening 23, the bore opening at the periphery of the disk to receive and accommodate the feathered extremity 27 of a manipulating element 28. This element projects through a slot in the handle or body portion 10 and is terminally provided with a depression 29 in which the thumb or finger of the user is placed when it is desired to operate the rod 20. In practice, the parts are normally positioned as illustrated in Figs. 1 and 2, and when it is desired to move anything from the prongs which tend to cling to the latter, the element 28 is depressed by the thumb of the user. Consequently, the rod 20 is moved through the top 12, and the cleaning element 17 over the prongs 16. As the rod 20 is thus moved against the tension of the spring 25, it is obvious that when the finger is moved from the element 28, the spring functions to return the parts to normal position automatically.

For the purpose of covering the slot 30 through which the element 28 moves, I provide a plate 31 having longitudinal flanges 32 which slidably embrace the flanges 33 carried by the hollow handle or body portion 10. The latter mentioned flanges are convergingly disposed, while the flanges 32 of the plate are arranged at the proper angle or inclination with respect thereto so that the plate 31 cannot become casually separated from the body portion or handle 10. The plate 31 is also provided with an opening through which the manipulating element 28 projects.

The cap 11 is provided with a recess 35, and passed through the wall of this recess is a threaded element 36 having a nut 37 associated therewith to hold the element in position upon the cap. The outer end of the element 36 is formed with an eye or loop 37 through which is passed a ring 38 utilized for hanging the fork upon a nail or other suitable support when not in use. When the fork is being used the ring 38 lies within the recess in the cap.

While I have shown and described what I consider the preferred embodiment of the invention, I desire to have it understood that I do not limit myself in this connection, and that such changes may be resorted to when desired, as fall within the scope of what is claimed.

What I claim is:

1. A fork comprising a hollow handle, prongs projecting from one end thereof, a cleaning element slidably mounted on said prongs, a rod supporting said element arranged to reciprocate within said handle, a disk carried by the inner end of said rod, a coiled spring encircling said rod and interposed between the disk and the opposite end of the handle, and adapted to support the rod in a position whereby the cleaning element will be disposed normally adjacent the handle, said disk being adjustable on said rod to vary the tension of said spring and means for operating said rod against the tension of said yieldable means.

2. A fork comprising a hollow handle, caps closing the opposite ends of said handle, said handle being relatively thick adjacent one end and provided with spaced parallel bores, a prong threaded within each bore, one end of said caps having openings disposed in alinement with said bore and through which opening the prongs project.

3. A fork comprising a hollow handle, caps closing the opposite ends of said handle, said handle being relatively thick adjacent one end and provided with spaced parallel bores, a prong threaded within each bore, one of said caps having openings disposed in alinement with said bores and through which openings the prongs project, a cleaning element slidably fitted between the prongs and engaging the latter, a rod connected with said element and arranged to reciprocate within the handle, said rod passing through an opening in said cap, a spring encircling said rod, an adjustable element carried by the upper end of said rod, against which said spring bears, and means for adjusting said rod and cleaning element against the tension of said spring.

In testimony whereof I affix my signature.

HUGH EMERY DENMAN.